(12) United States Patent
Zhu et al.

(10) Patent No.: US 9,730,549 B2
(45) Date of Patent: Aug. 15, 2017

(54) COFFEE BREWING DEVICE

(71) Applicant: SUZHOU INDUSTRIAL PARK KALERM ELECTRIC APPLIANCES CO., LTD., Suzhou, Jiangsu (CN)

(72) Inventors: Meisheng Zhu, Suzhou (CN); Chuqiao Li, Suzhou (CN)

(73) Assignee: SUZHOU INDUSTRIAL PARK KALERM ELECTRIC APPLIANCES CO. LTD., Suzhou (CN)

( * ) Notice: Subject to any disclaimer, the term of this patent is extended or adjusted under 35 U.S.C. 154(b) by 288 days.

(21) Appl. No.: 14/432,499

(22) PCT Filed: Mar. 1, 2013

(86) PCT No.: PCT/CN2013/000204
§ 371 (c)(1),
(2) Date: Mar. 31, 2015

(87) PCT Pub. No.: WO2014/059739
PCT Pub. Date: Apr. 24, 2014

(65) Prior Publication Data
US 2015/0289714 A1    Oct. 15, 2015

(30) Foreign Application Priority Data
Oct. 17, 2012   (CN) .......................... 2012 1 0392504

(51) Int. Cl.
*A47J 31/60* (2006.01)
*A47J 31/44* (2006.01)
*A47J 31/46* (2006.01)

(52) U.S. Cl.
CPC .............. *A47J 31/60* (2013.01); *A47J 31/44* (2013.01); *A47J 31/46* (2013.01)

(58) Field of Classification Search
CPC combination set(s) only.
See application file for complete search history.

(56) References Cited

U.S. PATENT DOCUMENTS 5,259,296 A * 11/1993 Mikael ................ A47J 31/3614
99/280
7,024,985 B2 * 4/2006 Park .................... A47J 31/3619
99/289 R (Continued)

FOREIGN PATENT DOCUMENTS

CN    201282920 Y    8/2009
CN    102144887 A    8/2011

(Continued)

OTHER PUBLICATIONS

CN102144887, China—2011—English Translation.*

(Continued)

*Primary Examiner* — Dana Ross
*Assistant Examiner* — Renee Larose

(57) ABSTRACT

Disclosed is a coffee brewing device, comprising a coffee box, brewing mechanism, water feeding and discharging mechanism and main body bracket. The coffee box is inside the lower end of the main body bracket; the brewing mechanism at the upper end. The coffee box mechanism is connected to the brewing mechanism, with water feeding and discharging mechanism on one side of the main body bracket, connected to a water way of the coffee box mechanism. The main body bracket has a coffee inlet, a drive component for driving and connecting the brewing mechanism, a first assembling hole for installing one end of the coffee box mechanism, and a second moving guide groove for movably installing the other end of the coffee box mechanism. The coffee brewing device has accurate drive control, simple water feed, quiet, quick, stable, no disman- (Continued)

tling or washing, long service life, reliable, and few mechanical parts.

7 Claims, 16 Drawing Sheets

(56) References Cited

U.S. PATENT DOCUMENTS

| | | | | |
|---|---|---|---|---|
| 8,408,117 | B2* | 4/2013 | De'Longhi | A47J 31/3614 99/289 R |
| 8,733,232 | B2* | 5/2014 | Buttiker | A47J 31/3614 99/289 R |
| 8,931,399 | B2* | 1/2015 | Buttiker | A47J 31/36 426/433 |
| 9,198,535 | B2* | 12/2015 | Righetti | A47J 31/42 |
| 9,408,489 | B2* | 8/2016 | Trio | A47J 31/3614 |
| 2008/0041234 | A1* | 2/2008 | Cortese | A47J 31/0673 99/290 |
| 2010/0083844 | A1* | 4/2010 | Budweg | A47J 31/3614 99/302 P |
| 2010/0186598 | A1* | 7/2010 | De' Longhi | A47J 31/3619 99/289 R |
| 2010/0236417 | A1* | 9/2010 | Sampaoli | A47J 31/3619 99/287 |

FOREIGN PATENT DOCUMENTS

| | | |
|---|---|---|
| CN | 102283582 A | 12/2011 |
| CN | 202086284 U | 12/2011 |
| DE | 4208854 A1 | 9/1993 |
| EP | 0559620 A1 | 9/1993 |

OTHER PUBLICATIONS

International Search Report of PCT Patent Application No. PCT/CN2013/000204 issued on Jun. 13, 2013.

1st Office Action of counterpart Chinese Patent Application No. 201210392504.3 issued on May 18, 2015.

Office Action of counterpart German Patent Application No. 112013005037.4 issued on Oct. 18, 2016.

* cited by examiner

COFFEE BREWING DEVICE

BACKGROUND OF THE INVENTION

1. Technical Field

The present invention relates to a coffee brewing device, in particular a coffee brewing device for an automatic coffee machine.

2. Description of the Related Art

In the prior art, the coffee brewing devices of fully automatic coffee devices have poor drive control, complicated water feeding structures, loud noises, long working periods, short service life, and high cost because of the complicated overall structure and numerous parts and components.

BRIEF SUMMARY OF THE INVENTION

To solve the above technical problems, the objective of the present invention is to provide a coffee brewing device has accurate drive control, a simple water feeding structure, low noise, short working period, stable performance, free from dismantling and washing, long service life, reliable performance, and few mechanical parts.

To fulfill the above objective, the present invention employs the following solution: A coffee brewing device comprises a coffee box, a brewing mechanism, a water feeding and discharging mechanism and a main body bracket. The coffee box is disposed inside the lower end of the main body bracket. The brewing mechanism is disposed at the upper end of the main body bracket. The coffee box mechanism is connected to the brewing mechanism. The water feeding and discharging mechanism is disposed on one side of the main body bracket, and is connected to a water way of the coffee box mechanism. The main body bracket is provided with a coffee inlet for adding coffee, a drive component for driving and connecting the brewing mechanism, a first assembling hole for installing one end of the coffee box mechanism, and a second moving guide groove for movably installing the other end of the coffee box mechanism.

Preferably, the coffee box mechanism comprises a coffee box, a residue ejecting mechanism and a resetting mechanism; one end of the residue ejecting mechanism is disposed in the coffee box; one end of the resetting mechanism is disposed on the coffee box; the other end of the residue ejecting mechanism is connected with the other end of the resetting mechanism; the coffee box is provided with a first cylinder disposed in the first assembling hole and a second cylinder movably disposed in the second moving guide groove.

Preferably, the brewing mechanism comprises a brewing head, drive parts for driving the coffee box mechanism to move, a large gear and an upper cover in drive connection with an external mechanism; the drive parts are fixedly connected to the left and right sides of the brewing head; the upper cover is disposed at the upper ends of the drive parts; the brewing head, the drive parts and the upper cover form a cavity for placing the large gear; and the large gear is disposed in the cavity.

Preferably, the water feeding and discharging mechanism comprises a water feeding and discharging mechanism main body, a water feeding switch, a stepping motor and a fixed mount; the stepping motor is disposed on the fixed mount; the fixed mount is disposed on the water feeding and discharging mechanism main body; the water feeding switch is disposed in the water feeding and discharging mechanism main body; the stepping motor is connected with the water feeding switch; the side end of the water feeding and discharging mechanism main body is provided with a water inlet; and the lower end of the water feeding and discharging mechanism main body is provided with a water outlet.

Preferably, the residue ejecting mechanism comprises a residue ejecting rod, a spring, a spring collar, a water distribution plate component; the water distribution plate component is disposed at the upper end of the residue ejecting rod; the residue ejecting rod is provided with a limiting boss for limiting; the spring collar is disposed at a position of the limiting boss; the spring is disposed between the water distribution plate component and the spring collar; the water distribution plate component comprises a first water distribution plate and a second water distribution plate; and the first water distribution plate is disposed on the second water distribution plate.

Preferably, the resetting mechanism comprises a resetting rod, a resetting rod rotating shaft, resetting rod drive arms and a resetting cylinder; the resetting rod rotating shaft is disposed on the resetting rod; the resetting rod drive arms are disposed at two ends of the resetting rod rotating shaft; and the resetting cylinder is disposed at one end of the resetting rod.

Preferably, one end of the residue ejecting mechanism and the other end of the resetting mechanism are connected to form a rotary connection mechanism which comprises a drive hole disposed at the lower end of the residue ejecting rod and a drive ring disposed at the other end of the resetting rod, and the drive hole is matched with the drive ring.

Preferably, each drive part is provided with a drive slot for driving the coffee box mechanism; the drive slot is matched with the first cylinder; the drive slot comprises a linear drive slot and an arc drive slot; the lower end of each drive part is provided with a resetting cam for realizing reset of the residue ejecting mechanism.

Preferably, the drive component of the main body bracket and the brewing mechanism form the threaded drive structure, comprising external screw threads disposed on the drive component and internal screw threads disposed on the large gear; and the external screw threads are matched with the internal screw threads.

Preferably, the coffee brewing device also comprises a resetting frame, characterized in that, the resetting frame is disposed at the lower end of the main body bracket, the resetting frame is provided with the limiting boss; and the limiting boss is matched with the resetting cylinder.

The coffee brewing device has beneficial effects: accurate drive control, a simple water feeding structure, low noise, short working period, stable performance, free from dismantling and washing, long service life, reliable performance, and few mechanical parts.

BRIEF DESCRIPTION OF THE SEVERAL VIEWS OF THE DRAWINGS

To more clearly describe the technical solution in the embodiments of the present invention, the following are brief introduction of the attached drawings used to describe the technology in the embodiments. Obviously, the attached drawings described below only involve some embodiments of the present invention. For those skilled in this field, other drawings can be made according to those drawings without creative labor.

Figure 1:
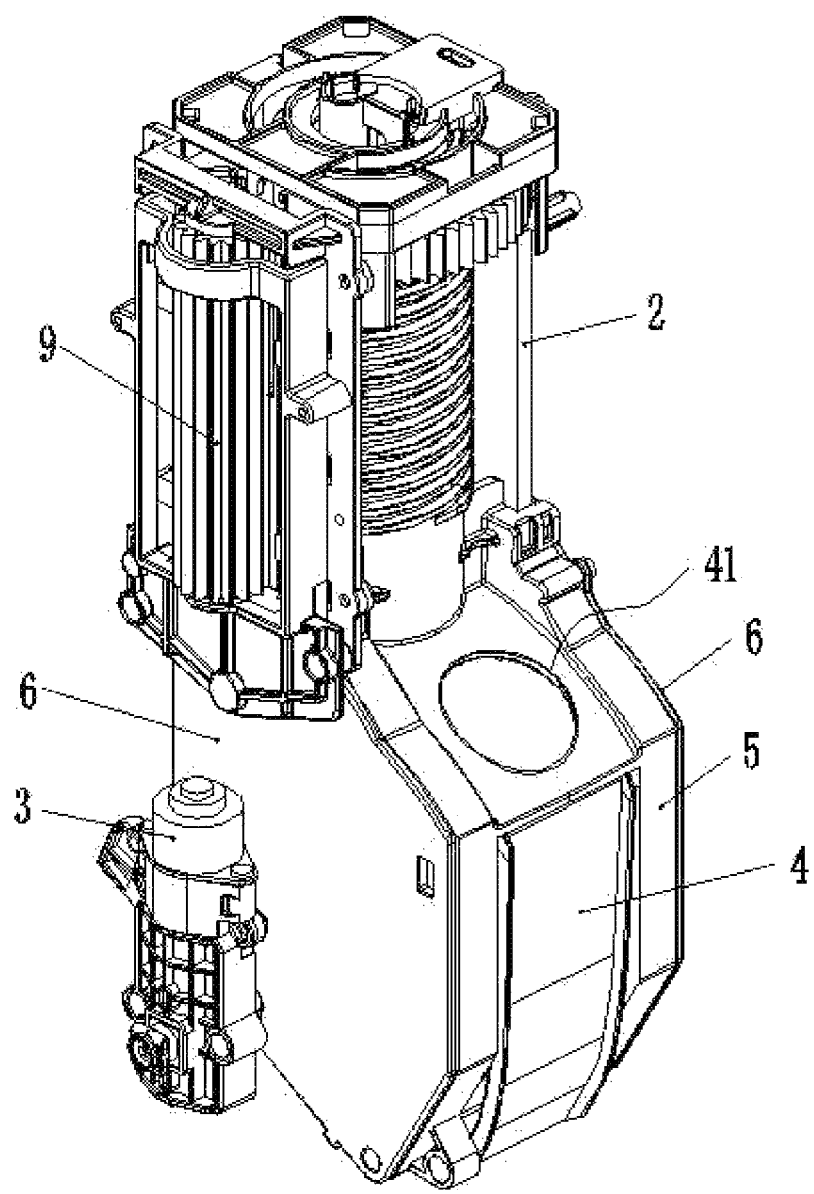
FIG. 1 is a space diagram of the present invention.

Names of parts represented by numbers and letters in the drawings:

1. Coffee box mechanism 11. Coffee box 111. First cylinder 112. Second cylinder 113. Mating hole 12. Residue ejecting mechanism 121. Residue ejecting rod 122. Spring 123. Spring collar 124. First water distribution plate 125. Second water distribution plate 126. Limiting boss 127. Drive hole;

13. Resetting mechanism 131. Resetting rod 132. Resetting rod rotating shaft 133. Resetting rod drive arm 134. Resetting cylinder 135. Drive ring;

2. Brewing mechanism 21. Brewing head 211. Connecting base 22. Drive part 221. Drive slot 222. Linear drive slot 223. Arc drive slot 224. Resetting cam 225. Connecting head 23. Large gear 231. Inner screw threads 24. Upper cover 25. Filter screen 26. Filter screen screw 27. coffee discharging connection;

3. Water feeding and discharging mechanism 31. Water feeding and discharging mechanism main body 311. Water inlet 312. Water outlet 32. Water feeding switch 33. Stepping motor 34. Fixed mount 35. Y-shaped sealing ring;

4. Main body bracket 41. Coffee inlet 42. Drive component 421. External screw threads 43. First assembling hole 44. Second moving guide groove;

5. Resetting frame 51. Limiting boss;

6. Outer cover 7. Water way of the coffee box 8. Coffee box water inlet 9. External drive mechanism 10. Coffee powder.

DETAILED DESCRIPTION OF THE INVENTION

The technical solution in embodiments of the present invention is clearly and completely described with reference to drawings in the embodiments of the present invention. Obviously, the described embodiments are only a part of embodiments in the present invention, not all the embodiments of the present invention. Based on the embodiments in the present invention, those ordinarily skilled in this field can obtain other embodiments without creative labor, which all shall fall within the protective scope of the present invention.

Figure 4:
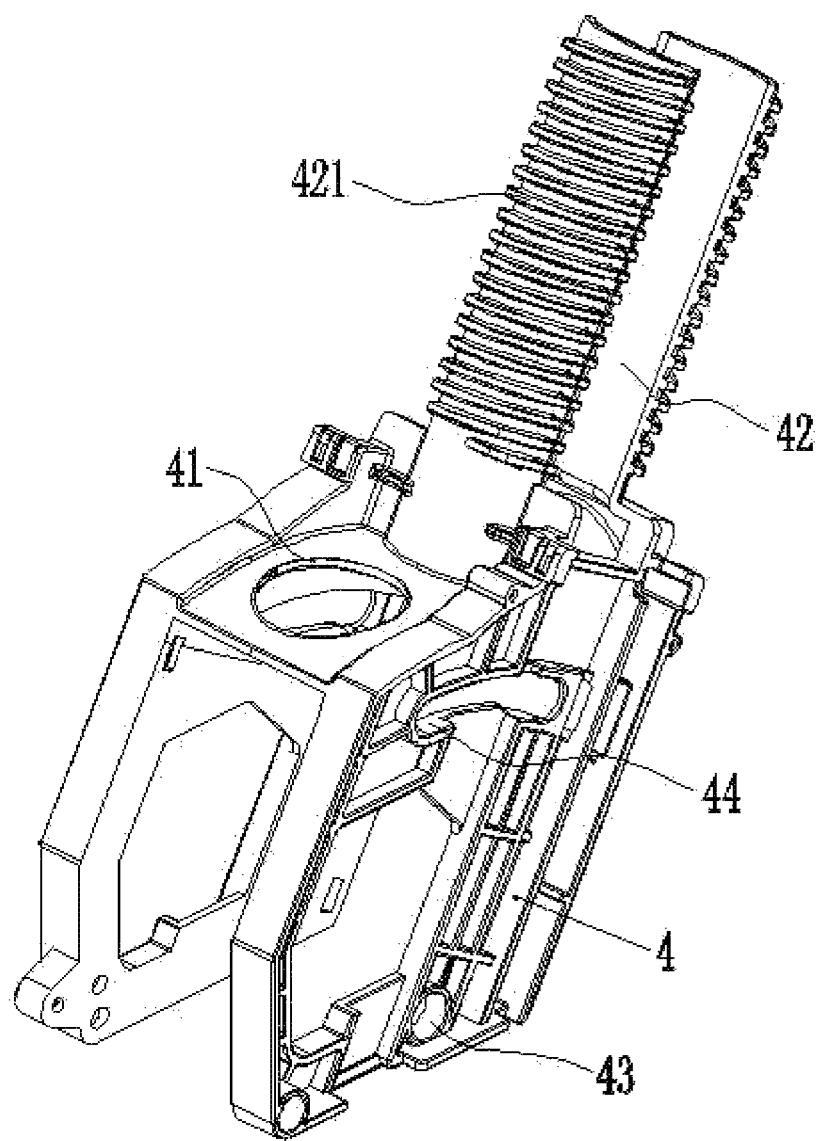
FIG. 4 is a structural view of the main body bracket of the present invention.

As shown in FIG. 1, a coffee brewing device comprises a coffee box mechanism 1, a brewing mechanism 2, a water feeding and discharging mechanism 3 and a main body bracket 4. The coffee box mechanism 1 is disposed inside the lower end of the main body bracket 4. The brewing device 2 is disposed at the upper end of the main body bracket 4. The coffee box mechanism 1 is connected to the brewing mechanism 2. The water feeding and discharging mechanism 3 is disposed on one side of the main body bracket 4, and is connected with a water way of the coffee box mechanism 1. As shown in FIG. 4, the main body bracket 4 is provided with a coffee inlet 41 for adding coffee, a drive component 42 for driving and connecting the brewing mechanism, a first assembling hole 43 for installing one end of the coffee box mechanism 1, and a second moving guide groove 44 for movably installing the other end of the coffee box mechanism 1.

Figure 5:
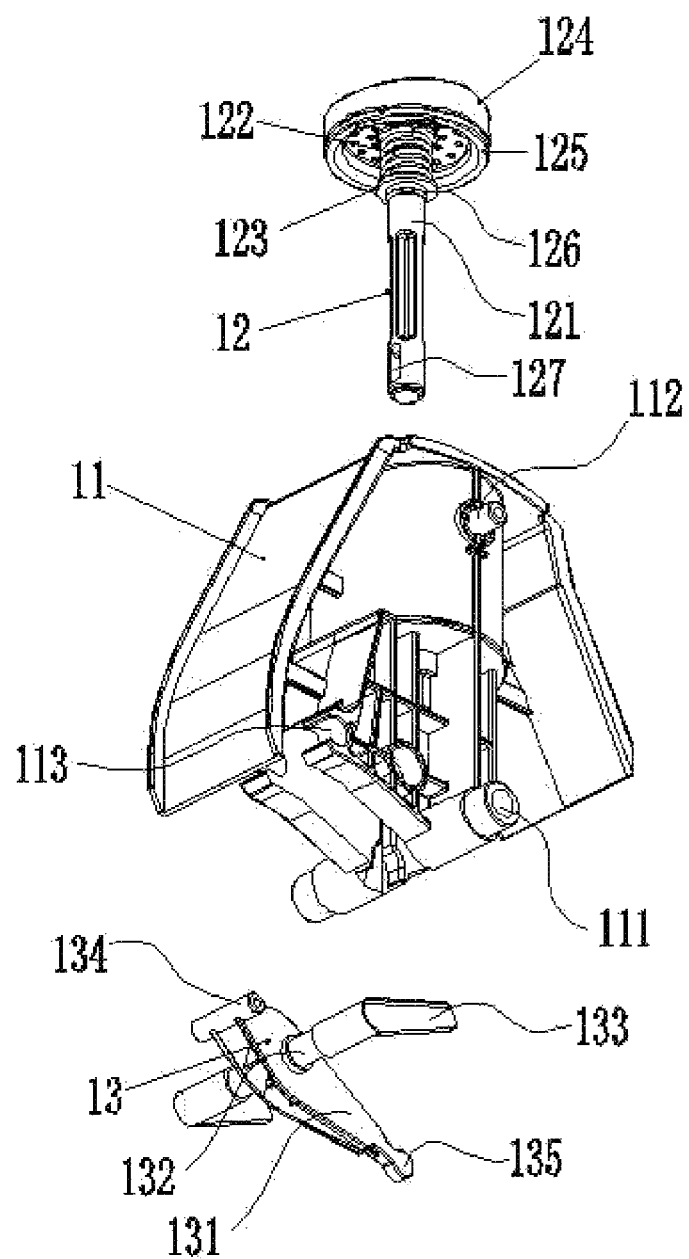
FIG. 5 is a structural view of the coffee box mechanism of the present invention.

As shown in FIG. 5, the coffee box mechanism 1 comprises a coffee box 11, a residue ejecting mechanism 12 and a resetting mechanism 13; one end of the residue ejecting mechanism 12 is disposed in the coffee box 11; one end of the resetting mechanism 13 is disposed on the coffee box 11; the other end of the residue ejecting mechanism 12 is connected with the other end of the resetting mechanism 13; the coffee box 11 is provided with a first cylinder 111 disposed in the first assembling hole 43 and a second cylinder 112 movably disposed in the second moving guide groove 44. The outer profile of the main body bracket 4 corresponds to the shape of the coffee box 11. In the assembled state, the first cylinder 111 is installed in the first assembling hole 43, and the second cylinder 112 is movably disposed in the second moving guide groove 44. The arc of the second moving guide groove 44 is a predetermined central angle centered on the first assembling hole 43. In this embodiment, the central angle is 30°.

Figure 6:
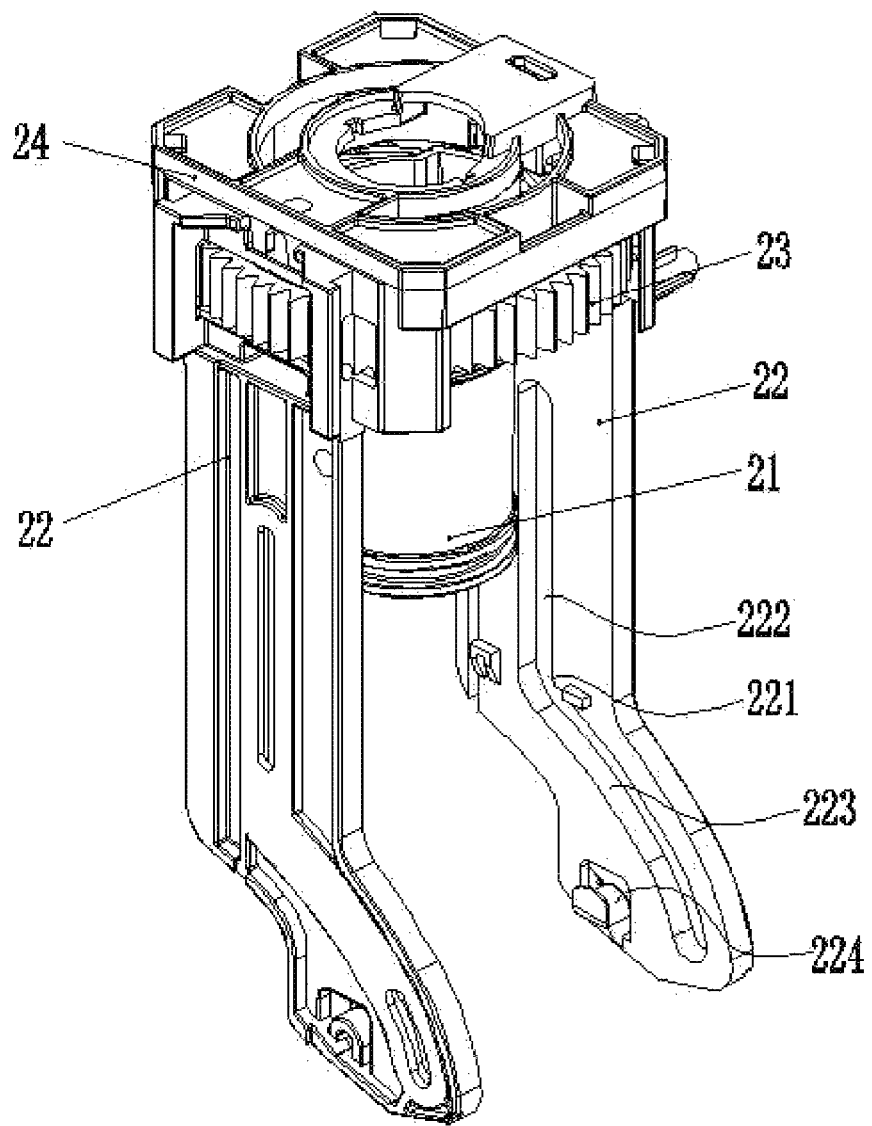
FIG. 6 is a structural view of the brewing mechanism of the present invention.

As shown in FIG. 6, the brewing mechanism 2 comprises a brewing head 21, drive parts 22 for driving the coffee box mechanism to move, a large gear 23 and an upper cover 24 in drive connection with an external drive mechanism 9. The drive parts 22 are fixedly connected to the left and right sides of the brewing head 21. The upper cover 24 is disposed at the upper ends of the drive parts 22. The brewing head 21, the drive parts 22 and the upper cover 24 form a cavity for placing the large gear 23. The large gear 23 is disposed in the cavity. The brewing mechanism 2 comprises an approximately cylindrical brewing head 21. The outside wall of the brewing head 21 is provided with a connecting base 211. The inside wall, facing the brewing head 21, of the drive part 22 is provided with a connecting head 225 corresponding to the connecting base 221. The drive parts 22 and the brewing head 21 are connected together through combining the connecting head 225 with the connecting base 211.

Figure 2:
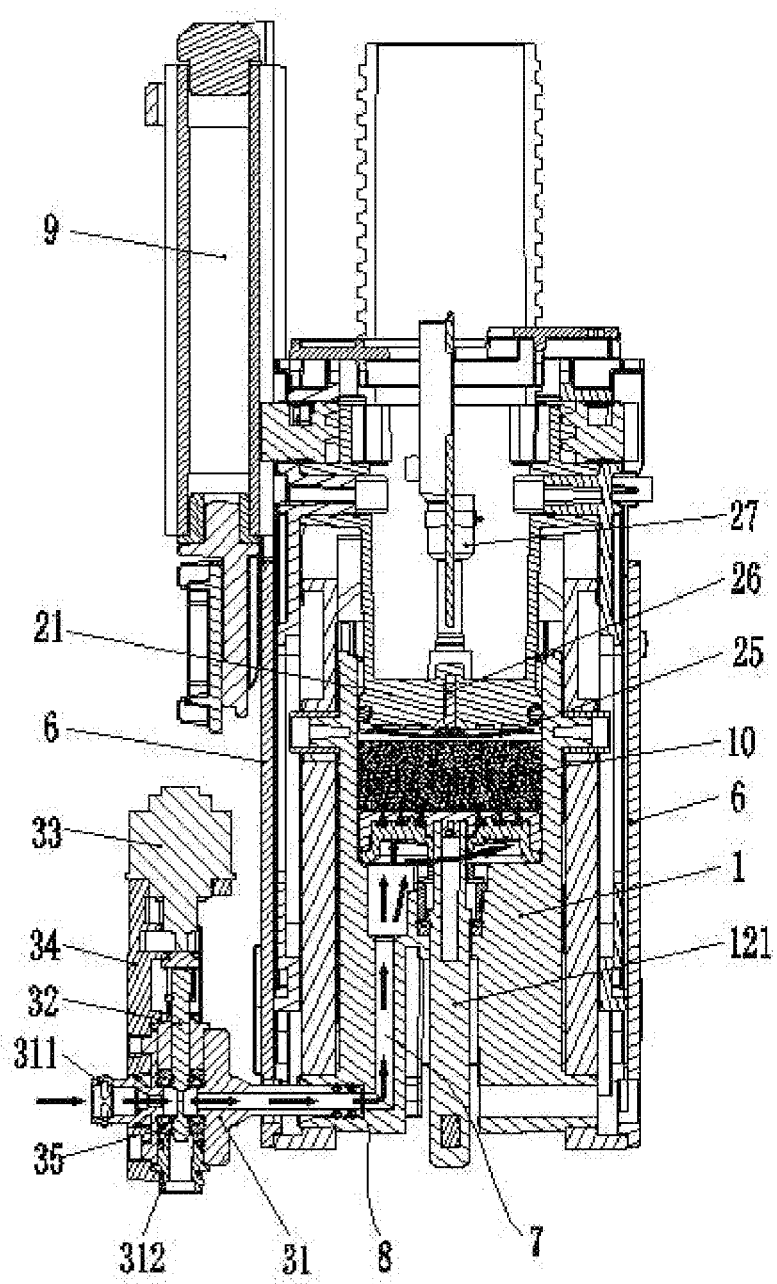
FIG. 2 is a schematic view of the present invention in the water feeding state.
Figure 3:
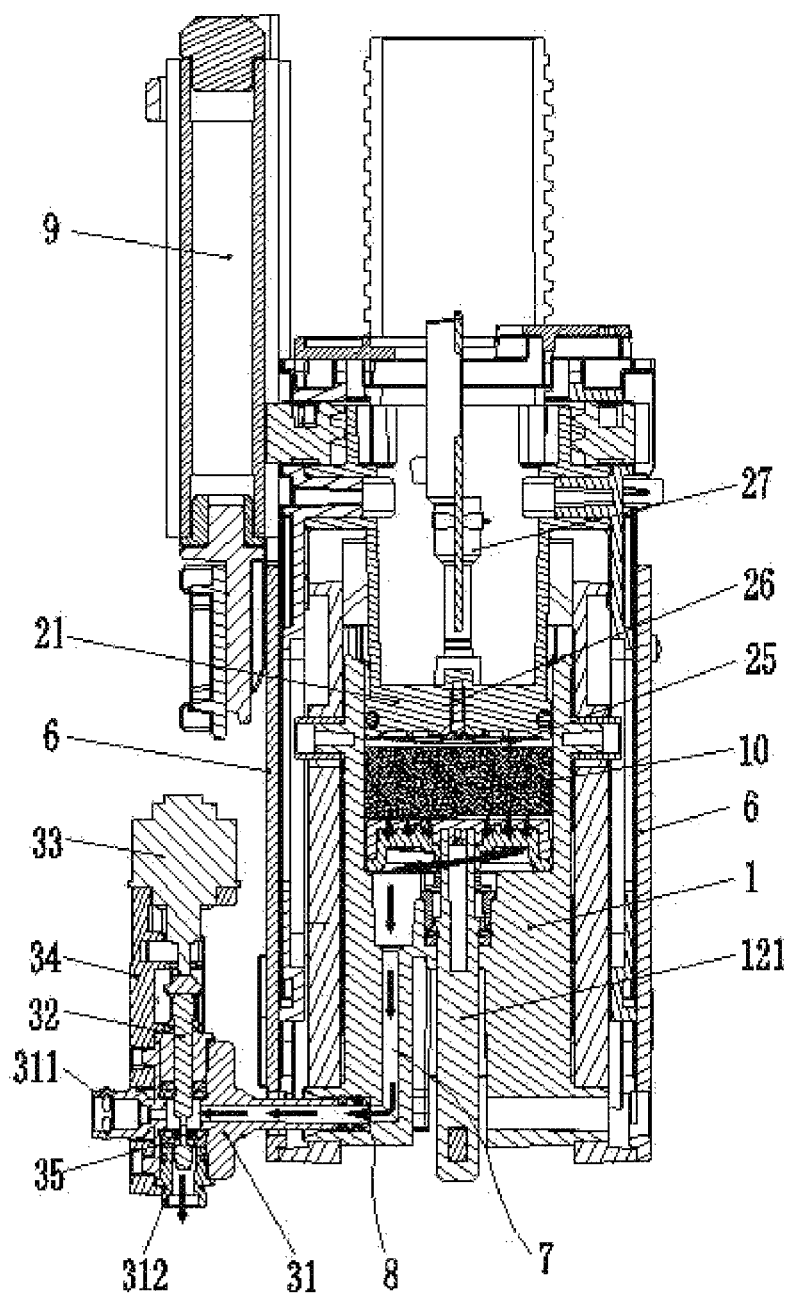
FIG. 3 is a schematic view of the present invention in the water discharging state.
Figure 9:
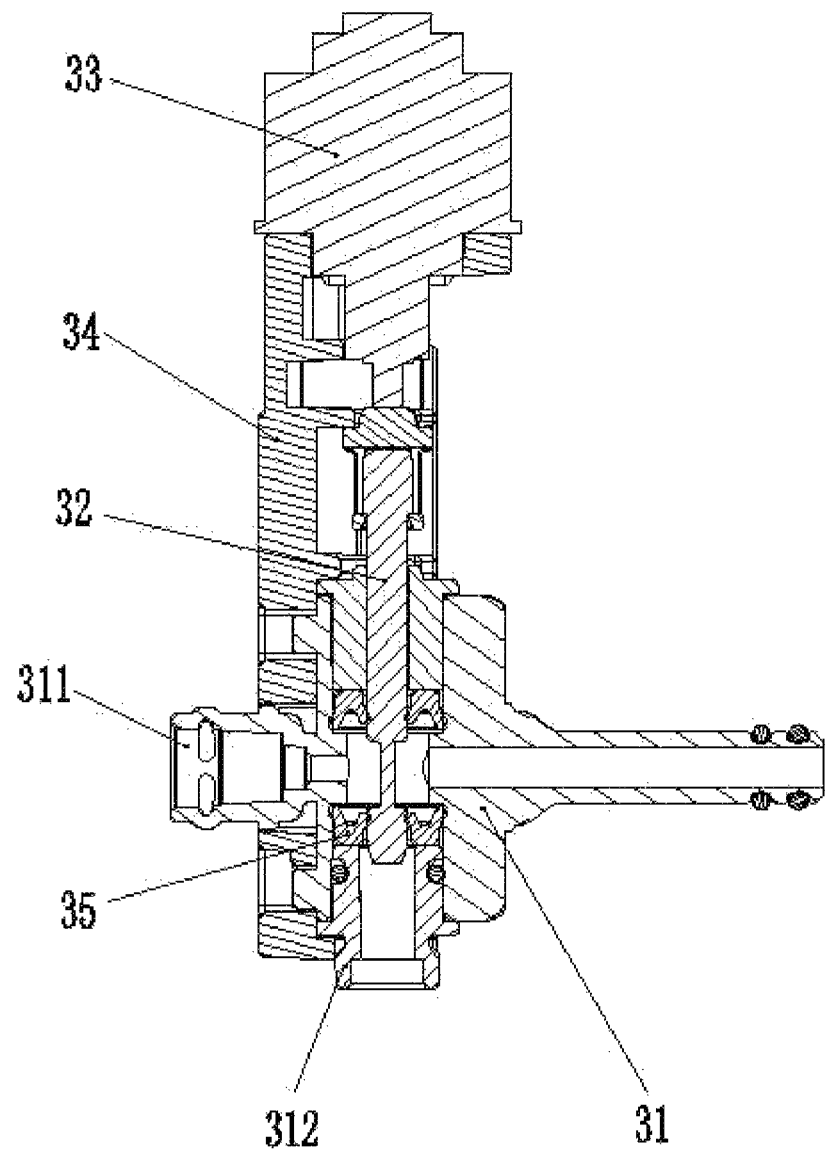
FIG. 9 is a structural view of the water feeding and discharging mechanism of the present invention.

As shown in FIG. 9, the water feeding and discharging mechanism 3 comprises a water feeding and discharging mechanism main body 31, a water feeding switch 32, a stepping motor 33 and a fixed mount 34. The stepping motor 33 is fixed at the fixed mount 34. The fixed mount 34 is disposed on the water feeding and discharging mechanism main body 31. The water feeding switch 32 is disposed in the water feeding and discharging mechanism main body 31. The stepping motor 33 is connected with the water feeding switch 32. The side end of the water feeding and discharging mechanism main body 31 is provided with a water inlet 311. The lower end of the water feeding and discharging mechanism main body 31 is provided with a water outlet 312. One end of the first cylinder 111 of the coffee box mechanism 1 is provided with a water way of coffee box 7. The water discharging connection of the water feeding and discharging mechanism 3 is directly assembled in the coffee box water inlet 8 of the coffee box mechanism 1. The water feeding and discharging mechanism 3 and the first cylinder 111 rotate around the same center of circle when the coffee box mechanism 1 changes its position. As shown in FIG. 2, the lower water outlet 312 of the water feeding and discharging mechanism 3 is closed during coffee brewing. As show in FIG. 3, after coffee brewing is finished, the lower water outlet 312 is open. The lower water outlet 312 of the water feeding and discharging mechanism 3 is open when the coffee machine is cleaned to remove calcium.

As shown in FIG. 5, the residue ejecting mechanism 12 comprises a residue ejecting rod 121, a spring 122, a spring collar 123 and a water distribution plate component. The water distribution plate component is disposed at the upper end of the residue ejecting rod 121. The residue ejecting rod 121 is provided with a limiting boss 126 for limiting. The spring collar 123 is disposed at the position of the limiting boss 126. The spring 122 is disposed between the water distribution plate component and the spring collar 123. The water distribution plate component includes a first water distribution plate 124 and a second water distribution plate 125, and the first water distribution plate 124 is disposed on the second water distribution plate 125. The spring 122 on the residue ejecting mechanism 12 is compressed when the brewing head 21 downward compresses the coffee powder 10. When the brewing head 21 slightly displaces upward, the spring 122 applies a thrust to the residue ejecting mechanism 12 to eject the coffee powder 10.

As shown in FIG. 5, the resetting mechanism 13 comprises a resetting rod 131, a resetting rod rotating shaft 132, resetting rod drive arms 133 and a resetting cylinder 134. The resetting rod rotating shaft 132 is disposed on the resetting rod 131. The resetting rod drive arms 133 are disposed at the two ends of the resetting rod rotating shaft 132. The resetting cylinder 134 is disposed at one end of the resetting rod 131.

As shown in FIG. 5, one end of the residue ejecting mechanism 12 and the other end of the resetting mechanism 13 are connected to form a rotary connection structure which comprises a drive hole 127 disposed at the lower end of the residue ejecting rod 121 and a drive ring 135 disposed at the other end of the resetting rod 131, and the drive hole 127 is matched with the drive ring 135.

Figure 7:
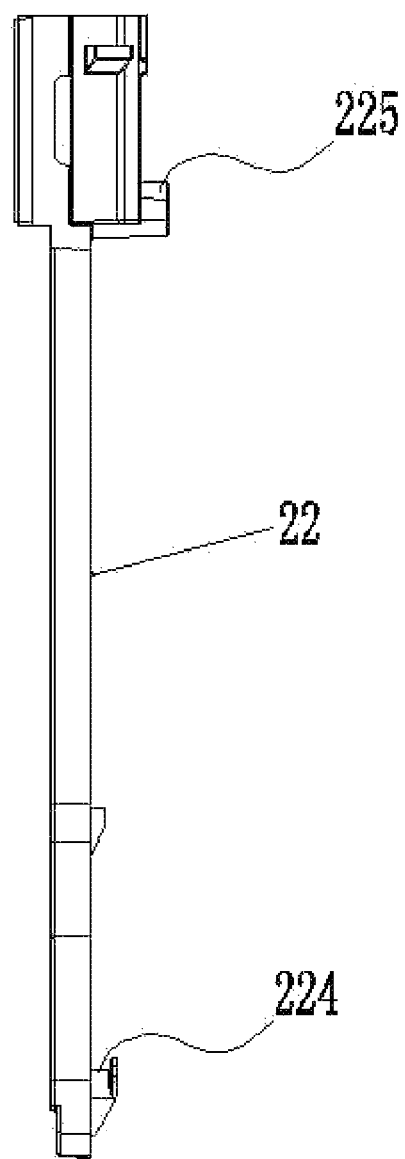
FIG. 7 is a structural view of the drive part of the present invention.

As shown in FIG. 7, each drive part 22 is provided with a drive slot 221 for driving the coffee box mechanism 1; the drive slot 221 is matched with the first cylinder 111; the drive slot 221 comprises a linear drive slot 222 and an arc drive slot 223; the lower end of the drive part 22 is provided with a resetting cam 224 for realizing reset of the residue ejecting mechanism 12. The drive part 22 generates a driving effect on the coffee box mechanism 1 through the drive slot 221. In this process, the second cylinder 112 penetrates through the second moving guide slot 44 and is disposed in the drive slot 221 to realize transmission of the driving force.

Figure 8:
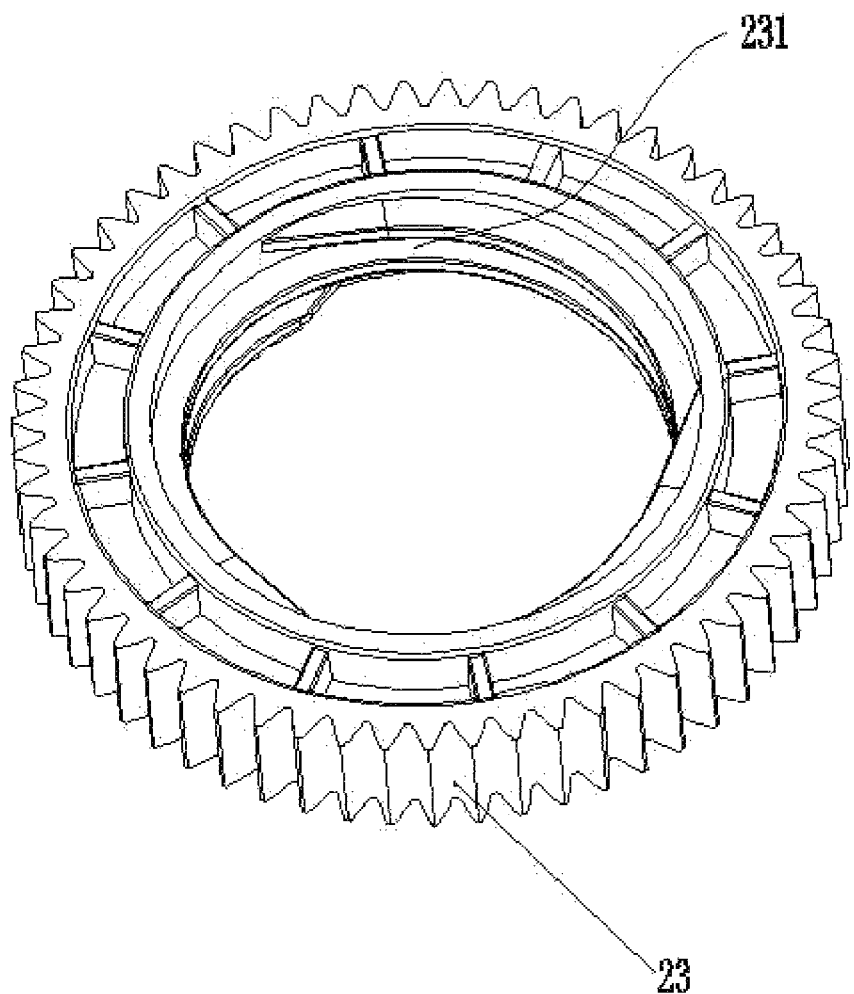
FIG. 8 is a structural view of the large gear of the present invention.

As shown in FIG. 4 and FIG. 8, the drive component 42 of the main bracket 4 and the brewing mechanism 2 form a threaded drive structure which comprises external screw threads 421 disposed on the drive component 42 and internal screw threads 231 disposed on the large gear 23, and the external screw threads 421 are matched with the internal screw threads 231. The main body bracket 4 is provided with the external screw threads 421 capable of being matched with the internal screw threads 231 of the large gear 23, the large gear on the drive component 42 rotates through the external screw threads 421 of the drive component 42, realizing changes in the position along the axial direction of the drive component 42, and thus the position of the brewing mechanism 2 changes.

Figure 10:
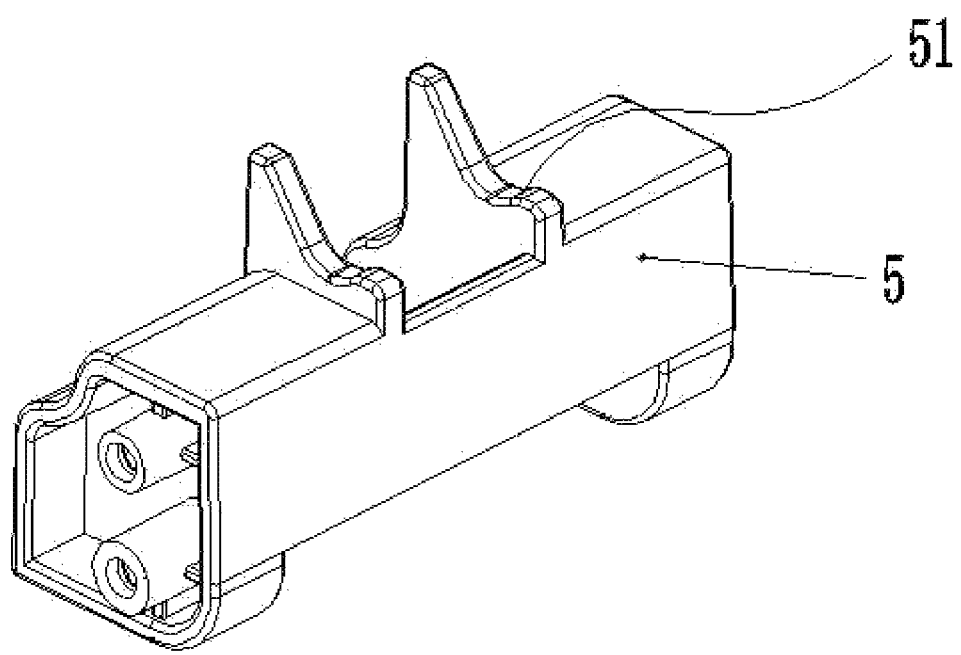
FIG. 10 is a structural view of the resetting frame of the present invention.

A shown in FIG. 10, a resetting frame 5 is also comprised. The resetting frame 5 is disposed at the lower end of the main body bracket 4. The resetting frame 5 is provided with a limiting boss 51. The limiting boss 51 is matched with the resetting cylinder 134. After the brewing mechanism 2 finishes the coffee brewing action, the drive part 22 drives the brewing head 21 to move upward. At the moment when the brewing head 21 is separated from the coffee residue, the residue ejecting mechanism 12 ejects the residue upward through its own spring force. The drive part 22 drives the resetting mechanism 13 to realize the action of pushing the residue ejecting mechanism 12. The resetting mechanism 13 realizes the reset of the residue ejecting mechanism 13 through mutual interaction with the limiting boss 51 of the resetting frame 5.

As shown in FIG. 1, the two sides of the main body bracket 4 are also provided with the outer cover 6, and the drive part 22 is fixed in the main body bracket 4.

Figure 11:
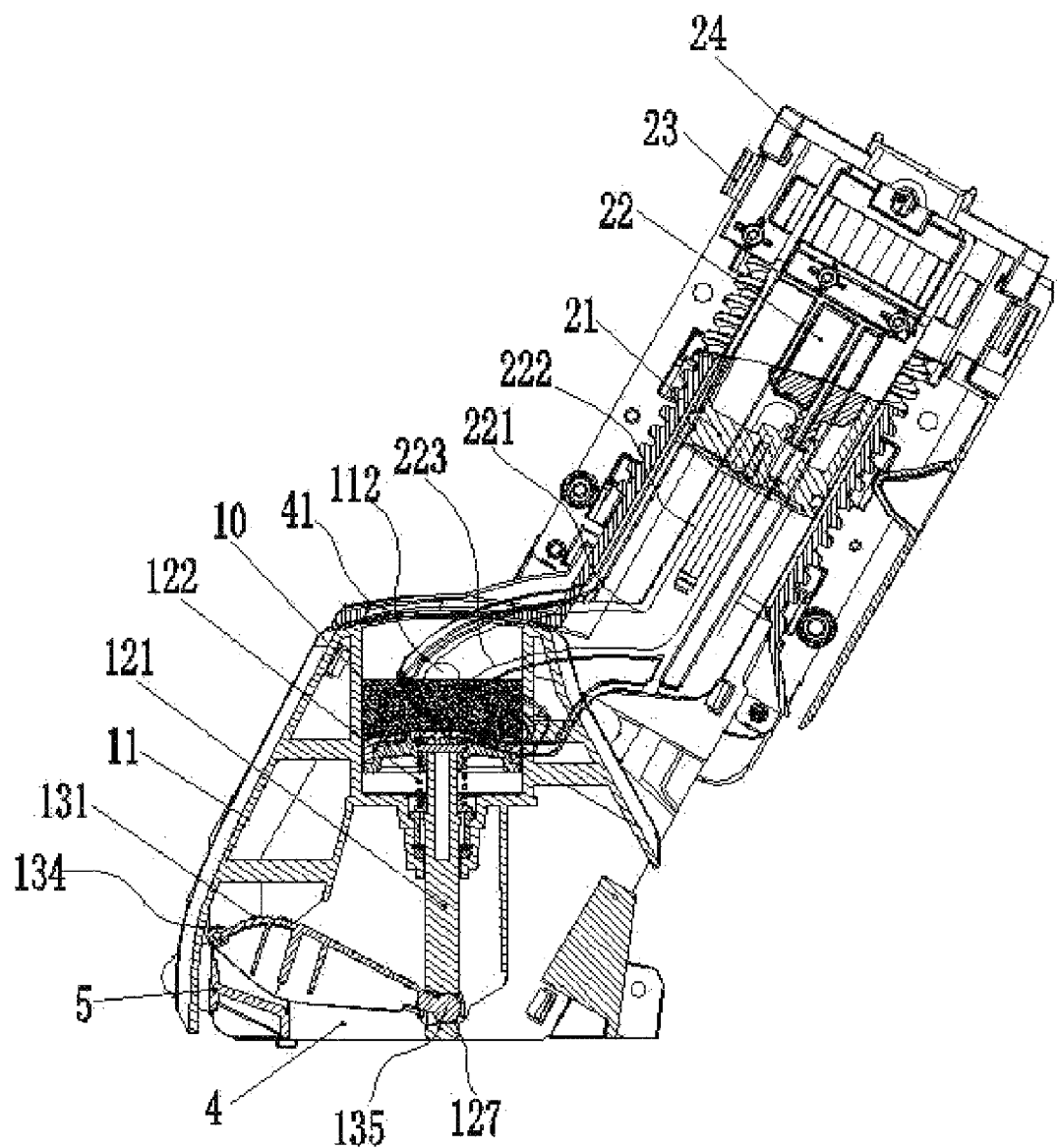
FIG. 11 is a schematic view of the present invention in the primary coffee adding state.

The following is the description of the working process of the brewing device of the present invention:

As shown in FIG. 11, the coffee powder 10 is added into the coffee box 11 through the coffee powder inlet 41 of the main body bracket 4. The external drive mechanism 9 drives the large gear 23 to rotate. The internal screw threads of 231 the large gear 23 are matched with the external screw threads 421 of the drive component 42 on the main body bracket 4. Through the threaded drive of two parts, the large gear 23 can move up and down on the main body bracket 4. The brewing mechanism 2 comprises an approximately cylindrical brewing head 21. The outside wall of the brewing head 21 is provided with a connecting base 211. The inside wall, facing the brewing head 21, of the drive part 22 is provided with a connecting head 225 corresponding to the connecting base 221. The drive parts 22 and the brewing head 21 are connected together through combining the connecting head 225 with the connecting base 211. The main body bracket 4 is provided with the external screw threads 421 capable of being matched with the internal screw threads 231 of the large gear 23, the large gear 23 on the drive component 42 rotates through the external screw threads 421 of the drive component 42, realizing changes in the position along the axial direction of the drive component 42, and thus the position of the brewing mechanism 2 changes. When the large gear 23 rotates clockwise, the lower end face of the large gear 23 contacts the upper end face of the connecting base 211 of the brewing head 21 to generate a downward thrust, thus driving the brewing head 21 to move downward. When the large gear 23 moves upward and down, the drive part 22 and the brewing head 21 can also move up and down together. The outer cover 6 is installed on the two sides of the main body bracket 4 to prevent the drive part 22 deviating from the motion rail.

The outer profile of the main body bracket 4 corresponds to the shape of the coffee box 11. In the assembled state, the first cylinder 111 is installed in the first assembling hole 43, and the second cylinder 112 is movably disposed in the second moving guide groove 44. The arc of the second moving guide groove 44 is a predetermined central angle centered on the first assembling hole 43. In this embodiment, the central angle is 30°. Therefore, the coffee box mechanism 1 can use the left and right first cylinders 111 at its lower end as the rotating shaft and the two second cylinders 112 at its upper end to reciprocally slide in second moving guide groove 44 of the main body bracket 4 in a 30° scope.

The drive part 22 is provided with a drive slot 221 for driving the coffee box mechanism 1; the drive slot 221 is matched with the first cylinder 111; the drive slot 221 comprises a linear drive slot 222 and an arc drive slot 223; the lower end of the drive part 22 is provided with a resetting cam 224 for realizing reset of the residue ejecting mechanism 12. The drive part 22 generates a driving effect on the coffee box mechanism 1 through the drive slot 221. In this process, the second cylinder 112 penetrates through the second moving guide slot 44 and is disposed in the drive slot 221 to realize transmission of the driving force and drive the coffee box mechanism 1 to swing left and right by an angle of 30°.

Figure 12:
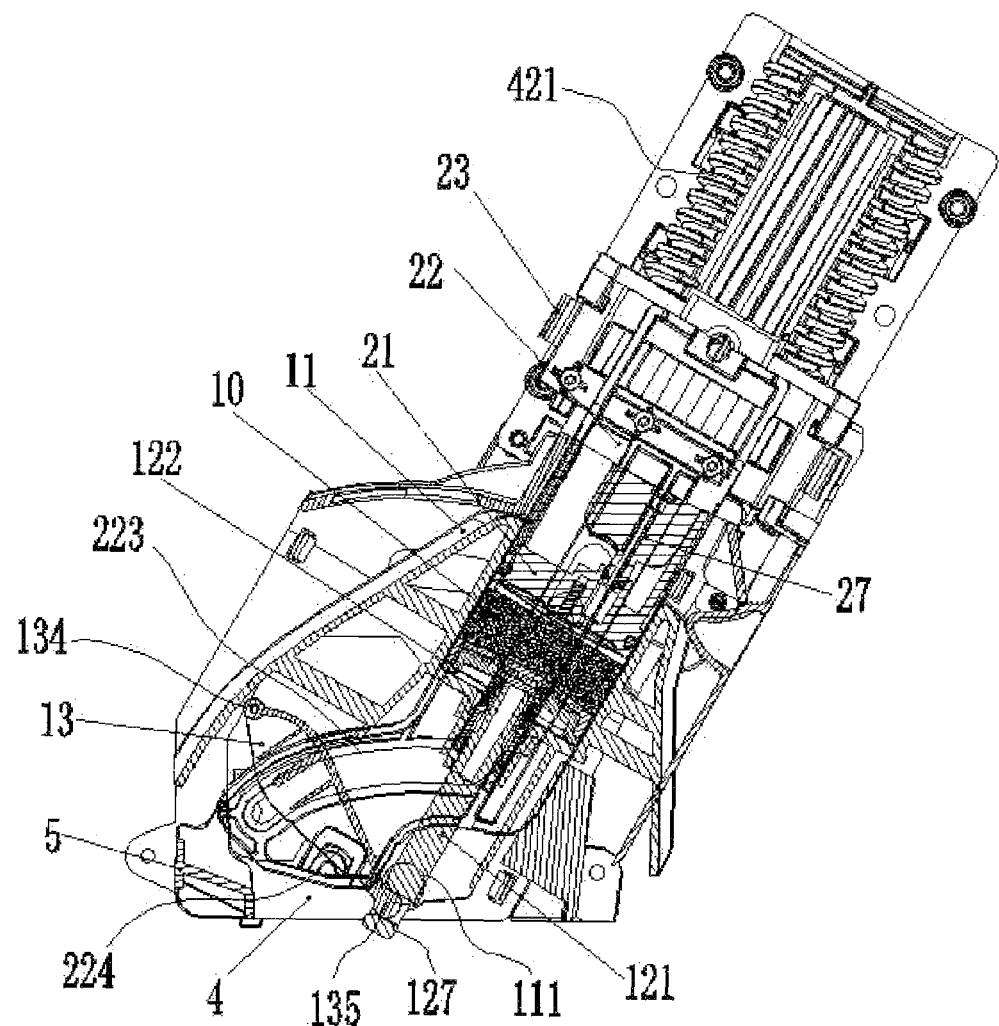
FIG. 12 is a schematic view of the present invention in the coffee compression state.

As shown in FIG. 12, the coffee box mechanism 1 rotates anti-clockwise when the two second cylinders 112 at the upper end of the coffee box mechanism 1 slide from the linear drive slot 222 to the arc drive slot 223 in the drive slot 221 of the drive part 22, and the coffee box mechanism 1 rotates clockwise when the two second cylinders 112 slide from the arc drive slot 223 to the linear drive slot 222. The large gear 23 drives the brewing mechanism 2 to keep moving downward. When the second cylinders 112 at the upper end of the coffee box 11 are located in the linear drive slot 222, the drive coffee box 1 stops rotating and keeps in the axial line with the brewing head 21. When the coffee box 11 is coaxial with the brewing head 21, the brewing head 21 keeps pressing downward. In such circumstances, the first water distribution plate 124 is stressed to drive the residue ejecting rod 121 to move downward together, while the spring collar 123 on the residue ejecting rod 121 is stopped by the limiting boss 126 of the residue ejecting rod 121, and the spring 122 is stressed to be compressed until the lower end face of the second water distribution plate 125 contacts the bottom surface of the coffee box 11. At this point, the brewing head 21 compresses the coffee powder 10 in the coffee box 11.

After the compression, the stepping motor 33 linearly moves upward to pull the piston type water feeding switch 32 to move upward, so the water feeding switch 32 is separated from the position of a Y-shaped sealing ring 35 in the initial water discharging state and the main shaft part of the water feeding switch 32 is sealed with the Y-shaped sealing ring 35. At this time, when water is fed to brew coffee, the hot water enters the water feeding and discharging mechanism main body 31, then directly enters the cavity between the coffee box 11 and the second water distribution plate 125 through the coffee box water inlet 8 on the coffee box mechanism 1, and next uniformly flows into the coffee power 10 via the water distribution holes of the first water distribution plate 124 and the second water distribution plate 125 to perform coffee extraction; and then, the coffee flows out from the coffee outlet on the brewing head 21 to the coffee discharging connection 27. An outlet connecting sealing ring is installed between the coffee discharging connection 27 and the brewing head 21 to prevent the coffee from overflowing.

The residue ejecting rod 121 and the coffee box 11 are sealed by the sealing ring of the residue ejecting rod, and during coffee brewing, coffee does not flow out from the lower end of the coffee box 11. The brewing head 21 and the coffee box 11 are sealed by the sealing ring of the brewing head, and coffee does not flow out from the periphery of the brewing head 21. A filter screen 25 is locked at the brewing head 21 through filter screen screws 26 to prevent the coffee powder 10 from escaping during coffee brewing.

Figure 13:
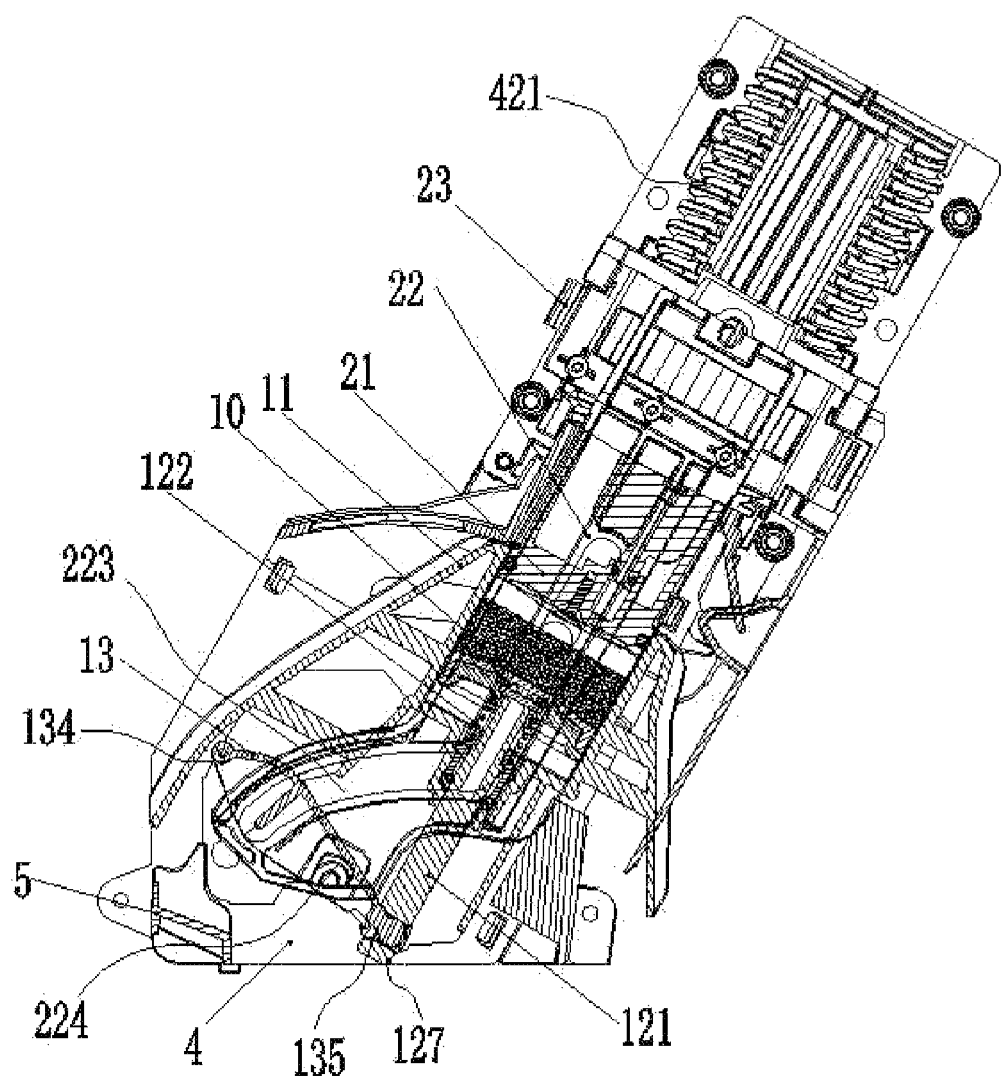
FIG. 13 is a schematic view of the present invention in the state where the coffee brewed.

As shown in FIG. 13, after coffee brewing is finished, the stepping motor 33 is driven to linearly move downward to push the water feeding switch 32 to move downward such that the switch slot on the water feeding switch 32 is located at the position of the Y-shaped sealing ring 35, the sealing ring loses the sealing effect, furthermore the water in the coffee box 11 directly flows from the water outlet 312.

Figure 14:
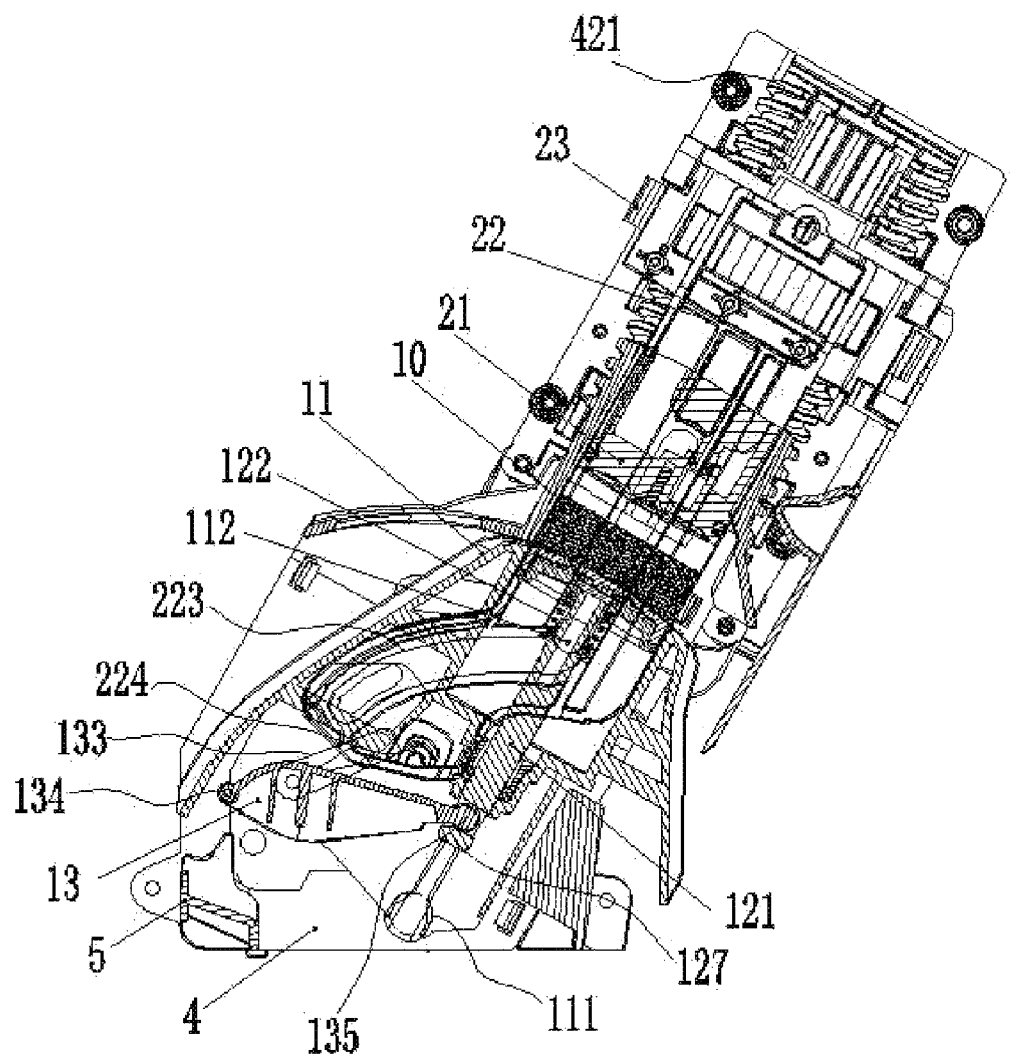
FIG. 14 is a schematic view of the present invention in the state where the coffee residue is ejected.

As shown in FIG. 14, drive parts 22 on the left and right sides of the brewing head 21 respectively have a resetting cam 224. The upper side of this projecting part is a plane, and the lower side is an inclined plane. When the drive parts 22 move upward, the force applied by the brewing head 21 to the coffee powder 10 disappears, the residue ejecting rod 121 is pushed upward by the spring force of the spring 122 of residue ejecting rod, and then the compact coffee powder 10 compressed by the brewing head 21 becomes fluffy. The pushing space of the spring is 6 mm. Before the drive parts 22 drive the resetting rod 131 to eject the coffee residue, the spring 122 can eject the coffee residue in the coffee box 11 upward by 6 mm in advance. In such circumstances, the brewing head 21 keeps moving upward until the upper end faces of the projecting parts of the resetting cams 224 of the drive parts 22 on the left and right sides of the brewing head 21 contact the resetting drive arms 133 on the left and right sides of the resetting rod 131, so as to drive the resetting rod 131 to rotate around the mating hole 113 on the coffee box 11 by taking the resetting rod rotating shaft 132 as the center of circle.

As shown in FIG. 14, when the second cylinders 112 at the upper end of the coffee box 11 slide in the linear drive slots 222 of the drive slots 222 on the drive parts 22 of the brewing head 21, the coffee box mechanism 1 does not rotate, and the resetting cams 224 below the drive parts 22 contact the lower end faces of the resetting drive arms 133 on the left and right sides of the resetting rod 131, so the resetting rod 131 rotates clockwise, and the rotation of the resetting rod 131 also applies a thrust through the drive circle 135 to the driving hole 127 of the residue ejecting rod 121 so as to drive the residue ejecting rod 121 to move upward. When the second cylinders 112 at the upper end of the coffee box 11 slide to the arc drive slots 223 of the drive slots 221 of the drive parts, all coffee residue has been ejected out of the cavity of the coffee box 11.

Figure 15:
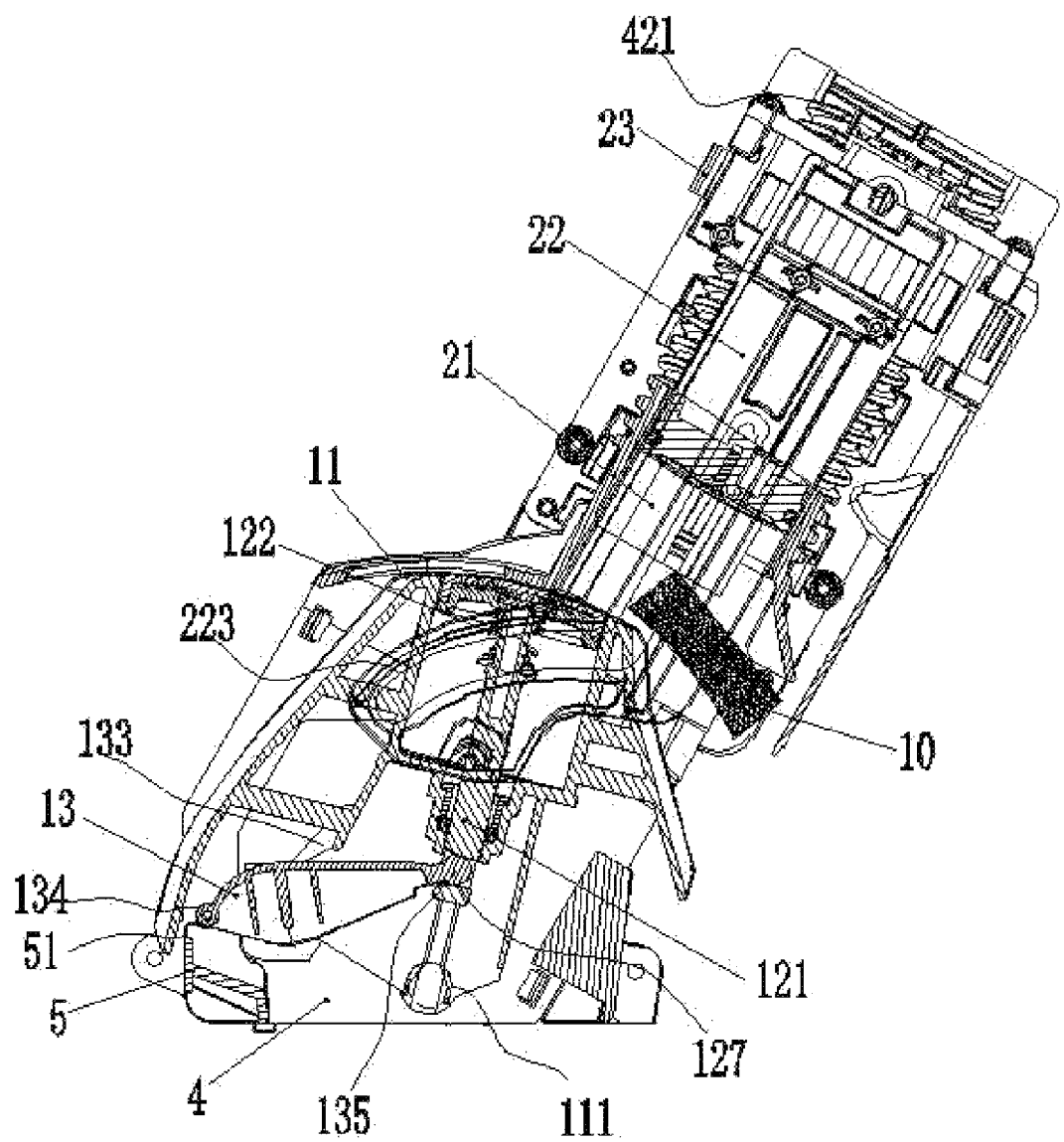
FIG. 15 is a schematic view of the present invention in the state where the coffee residue is scraped.

As shown in FIG. 15, the coffee box mechanism 1 starts to rotate anticlockwise. During rotation, the coffee residue is stopped by the inside end face of the external screws 421 on the main body bracket 4. In such circumstances, the resetting cams 224 below the drive parts 22 are separated from the lower end faces of the resetting drive arms 133 on the left and right sides of the resetting rod 131. The coffee box mechanism 1 continuously rotates anticlockwise, and the residue on the residue ejecting mechanism 12 is scraped.

Figure 16:
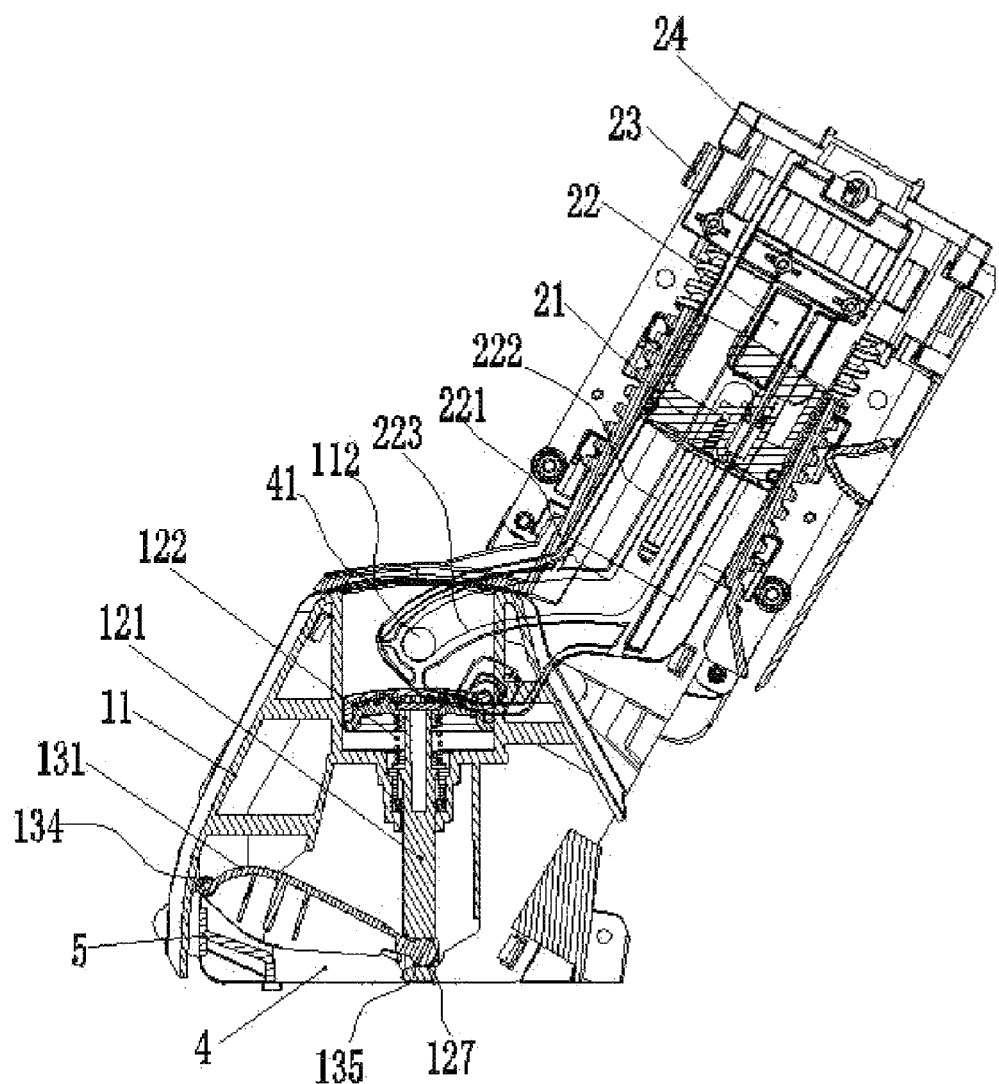
FIG. 16 is a schematic view of the present invention in the standby state.

As shown in FIG. 16, when the coffee box mechanism 1 rotates, the outer surface of the resetting cylinder 134 of the resetting rod 131 contacts the upper end face of the limiting boss 51 at the upper end of the resetting frame 5. When the drive part 22 continuously moves upward to drive the coffee box mechanism 1 to rotate anticlockwise, the outer surface of the resetting cylinder 134 at the lower end of the resetting rod 131 is stopped by the upper end face of the limiting boss 51 at the upper end of the resetting frame, so the resetting rod 131 rotates anti-clockwise around the mating hole 113 on the coffee box 11 by taking the resetting rod rotating shaft 132 as the center of circle. In such circumstances, the drive circle 135 of the resetting rod 131 applies a downward thrust to the lower end face of the drive hole 127 of the residue ejecting rod 121, pulling the residue ejecting rod 121 to move downward. When the drive part 22 continuously moves upward to drive the coffee box mechanism 1 to rotate anticlockwise by an angle of 30°, the coffee box mechanism 1 returns to the coffee powder adding state, and the resetting rod 131 drives the residue rejecting rod 121 to return to the initial position. Then, the whole coffee brewing process is complete.

The coffee brewing device has beneficial effects: accurate drive control, a simple water feeding structure, low noise, short working period, stable performance, free from dismantling and washing, long service life, reliable performance, and few mechanical parts.

Through description of the above disclosed embodiments, those skilled in this field can realize or use the present invention. It is obvious for those skilled in this field to obtain various modifications of those embodiments. The general principle defined in this document can apply to other embodiments within the spirit or scope of the present invention. Therefore, the present invention is not limited to those embodiments therein, but applies to the widest scope consistent with the principle and novel characteristics disclosed in the present invention.

What is claimed is:

1. A coffee brewing device, comprising a coffee box mechanism, a brewing mechanism, a water feeding and discharging mechanism and main body bracket, wherein, the coffee box mechanism is disposed inside a lower end of the main body bracket; the brewing mechanism is disposed at an upper end of the main body bracket; the coffee box mechanism is connected to the brewing mechanism; the water feeding and discharging mechanism is disposed at one side of the main body bracket, and is connected to a water way of the coffee box mechanism: the main body bracket is provided with a coffee inlet for adding coffee, a drive component for driving and connecting the brewing mechanism, a first assembling hole for installing one end of the coffee box mechanism, and a second moving guide groove for movably installing the other end of the coffee box mechanism, wherein, the coffee box mechanism comprises a coffee box, a residue ejecting mechanism and a resetting mechanism; one end of the residue ejecting mechanism is disposed in the coffee box; one end of the resetting mechanism is disposed on the coffee box; the other end of the residue ejecting mechanism is connected with the other end of the resetting mechanism; the coffee box is provided with a first cylinder disposed in the first assembling hole and a second cylinder movably disposed in the second moving guide groove, wherein, the brewing mechanism comprises a brewing head, drive parts for driving the coffee box mechanism to move, a large gear and an upper cover in drive connection with an external mechanism; the drive parts fixedly connected to the left and right sides of the brewing head; the upper cover is disposed at upper ends of the drive parts; the brewing head, the drive part and the upper cover form a cavity for placing the large gear; and the large gear is disposed in the cavity, wherein, the water feeding and discharging mechanism comprises a water feeding and discharging mechanism main body, a water feeding switch, a stepping motor and a fixed mount; the stepping motor is disposed on the fixed mount; the fixed mount is disposed on the water feeding and discharging mechanism main body; the water feeding switch is disposed in the water feeding and discharging mechanism main body; the stepping motor is connected with the water feeding switch; the side end of the water feeding and discharging mechanism main body is provided with a water inlet; and a lower end of the water feeding and discharging mechanism main body is provided with a water outlet.

2. The coffee brewing device according to claim 1, wherein, the residue ejecting mechanism comprises a residue ejecting rod, a spring, a spring collar, a water distribution plate component; the water distribution plate component is disposed at an upper end of the residue ejecting rod; the residue ejecting rod is provided with a limiting boss for limiting; the spring collar is disposed at a position of the limiting boss; the spring is disposed between the water distribution plate component and the spring collar; the water distribution plate component comprises a first water distribution plate and a second water distribution plate; and the first water distribution plate is disposed on the second water distribution plate.

3. The coffee brewing device according to claim 2, wherein, the resetting mechanism comprises a resetting rod, a resetting rod rotating shaft, a resetting rod drive arm and a resetting cylinder; the resetting rod rotating shaft is disposed on the resetting rod; the resetting rod drive arm is disposed at two ends of the resetting rod rotating shaft; and the resetting cylinder is disposed at one end of the resetting rod.

4. The coffee brewing device according to claim 3, wherein, one end of the residue ejecting mechanism and the other end of the resetting mechanism are connected to form a rotary connection mechanism which comprises a drive hole disposed at a lower end of the residue ejecting rod and a drive ring disposed at the other end of the resetting rod, and the drive hole is matched with the drive ring.

5. The coffee brewing device according to claim 4, wherein, each drive part is provided with a drive slot for driving the coffee box mechanism; the drive slot is matched with the first cylinder; the drive slot comprises a linear drive slot and an arc drive slot; a lower end of each drive part is provided with a resetting cam for realizing reset of the residue ejecting mechanism.

6. The coffee brewing device according to claim 5, wherein, the drive component of the main body bracket and the brewing mechanism form the threaded drive mechanism, comprising external screw threads disposed on the drive component and internal screw threads; and the external screw threads are matched with the internal screw threads.

7. The coffee brewing device according to claim 6, also comprising a resetting frame, wherein, the resetting frame is disposed at the lower end of the main body bracket the resetting frame is provided with the limiting boss; and the limiting boss is matched with the resetting cylinder.

* * * * *